United States Patent Office 3,763,156
Patented Oct. 2, 1973

3,763,156
2-HETEROCYCLIC AMINO-4-MORPHOLINO-THIENO[3,2-d]PYRIMIDINES
Eberhard Woitun, Gerhard Ohnacker, Berthold Narr, Ulrike Horch, and Rudolf Kadatz, Biberach (Riss), Germany, assignors to Boehringer Ingelheim G.m.b.H., Ingelheim am Rhein, Germany
No Drawing. Filed Jan. 22, 1971, Ser. No. 108,988
Claims priority, application Germany, Feb. 28, 1970, P 20 03 714.3; Nov. 26, 1970, P 20 58 086.3, P 20 58 085.2
Int. Cl. C07d 87/46
U.S. Cl. 260—247.1          1 Claim

ABSTRACT OF THE DISCLOSURE

Compounds of the formula

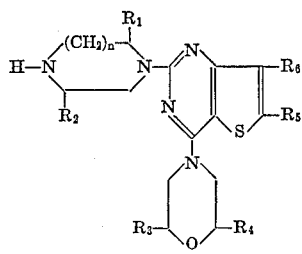

wherein
$R_1$, $R_2$, $R_3$, $R_4$ and $R_6$, which may be identical to or different from each other, are each hydrogen or methyl,
$R_5$ is hydrogen, methyl or phenyl, and
$n$ is 1 or 2,
and non-toxic, pharmacologically acceptable acid addition salts thereof; the compounds as well as their salts are useful as inhibitors of thrombocyte aggregation in blood.

This invention relates to novel 2-heterocyclic amino-4-morpholino-thieno[3,2-d]pyrimidines and non-toxic acid addition salts thereof, as well as to various methods of preparing these compounds.

More particularly, the present invention relates to compounds of the formula

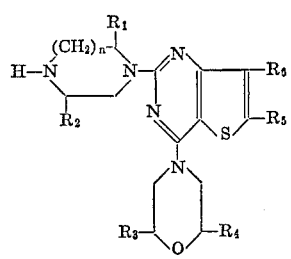

(I)

wherein
$R_1$, $R_2$, $R_3$, $R_4$ and $R_6$, which may be identical to or different from each other, are each hydrogen or methyl,
$R_5$ is hydrogen, methyl or phenyl, and
$n$ is 1 or 2,
and non-toxic, pharmacologically acceptable acid addition salts thereof.

The compounds embraced by Formula I may be prepared by the following methods:

METHOD A

By reacting a 4-morpholino-thieno[3,2-d]pyrimidine of the formula

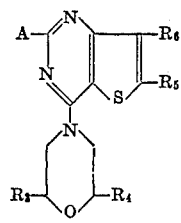

(II)

wherein $R_3$, $R_4$, $R_5$ and $R_6$ have the same meanings as in Formula I and A is halogen, lower alkylsulfonyl, mercapto or lower alkylmercapto, with a heterocyclic amine of the formula

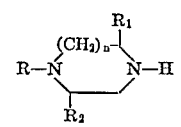

(III)

wherein $R_1$, $R_2$ and $n$ have the same meanings as in Formula I and R is hydrogen or a substituent which is removable by treatment with acids or alkalis, such as carbethoxy or formyl, and, if R is a removable substituent as defined above, subsequently removing the same.

METHOD B

By reacting a 2-heterocyclic amino-thieno[3,2-d]pyrimidine of the formula

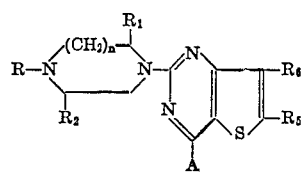

(IV)

wherein
R has the same meanings as in Formula III,
A has the same meanings as in Formula II, and
$R_1$, $R_2$, $R_5$, $R_6$ and $n$ have the same meaning as in Formula I,
with a morpholine of the formula

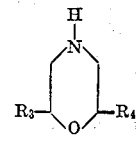

(V)

wherein $R_3$ and $R_4$ have the same meanings as in Formula I, and, if R is other than hydrogen, subsequently removing the same by treatment with an acid or alkali.

METHOD C

By intramolecular cyclization of a 2-heterocyclic amino-4-[di(hydroxy-alkyl)-amino]-thieno[3,2-d]pyrimidine of the formula

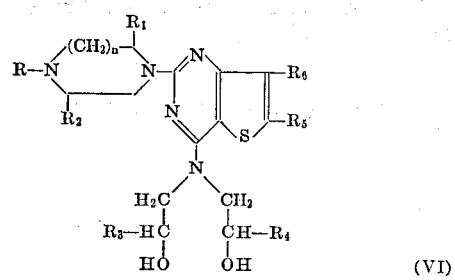

(VI)

wherein $R_1$, $R_2$, $R_3$, $R_4$, $R_5$, $R_6$ and $n$ have the same meanings as in Formula I, and R has the same meanings as in Formula III, and, if R is other than hydrogen, removing the same simultaneously with or subsequent to the cyclization reaction.

The reaction in methods A and B is carried out at a temperature between 0 and 200° C. and, if A in Formulas II and IV is halogen, advantageously in the presence of an acid-binding agent, such as an inorganic or tertiary organic base; however, at least a molar excess of the amines of the Formula III or V, respectively, over and above the stoichiometric amount required for reaction with Compounds II and IV, respectively, may also serve as the acid-binding agent. A still greater excess of these amines may also serve as the solvent medium for the reaction. If the reaction is carried out in the presence of a solvent medium, examples of suitable solvents are lower alkanols, such as ethanol; ethers, such as dioxane; high-boiling-point ketones; or dimethylformamide. However, the presence of a solvent medium is not absolutely essential; the reaction also proceeds satisfactorily without a solvent.

The optimum reaction temperature depends largely upon the reactivity of the reactants. In general, if A is halogen or lower alkylsulfonyl the reaction proceeds more rapidly and at lower temperatures than if A is a mercapto substituent.

In those instances where the reaction of method A or B yields an intermediate compound of the formula wherein

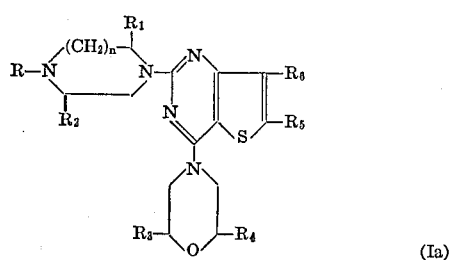

(Ia)

$R_1$, $R_2$, $R_3$, $R_4$, $R_5$, $R_6$ and $n$ have the same meanings as in Formula I, and R has the same meanings as in Formula III except hydrogen, the substituent R is advantageously removed and the intermediate converted into the corresponding compound of the Formula I by boiling with a strong inorganic acid, especially with concentrated hydrochloric acid, whereby the corresponding inorganic acid addition salt of the desired base of the Formula I is formed, and liberating the free base by addition of an aqueous alkali.

The intramolecular cyclization pursuant to method C is carried out in the presence of an acid condensation agent at a temperature between 0 and 175° C. and, if desired, in the presence of an inert solvent. Examples of suitable acid condensation agents are sulfuric acid, phosphoric acid, perchloric acid, hydrochloric acid, hydrobromic acid, p-toluenesulfonic acid, anhydrous metal salts such as zinc chloride, or cation exchangers. Examples of suitable solvents are higher-molecular-weight hydrocarbons, such as tetrahydronaphthalene, or also any of the acids used as the condensation agent. However, the cyclization may also be performed without a solvent or in the molten state. The free base of the Formula I is isolated from the cyclization reaction mixture by addition of a strong alkali.

The compounds of the Formula I are organic bases and, therefore, form acid addition salts with inorganic or organic acids. Examples of non-toxic, pharmacologically acceptable acid addition salts are those formed with hydrochloric acid, sulfuric acid, phosphoric acid, succinic acid, tartaric acid, citric acid, maleic acid, fumaric acid, 8-chlorotheophylline or the like.

The starting compounds of the Formulas II and IV, wherein A is halogen, mercapto or lower alkylmercapto, may be prepared by the methods described in German Offenlegungsschrift (DOS) No. 1,470,356. A 3-amino-thiophene-2-carboxylic acid or a reactive derivative thereof is first reacted with urea or thiourea; particularly suitable as reactive derivatives of 3-amino-thiophene-2-carboxylic acid are its esters, amides or thioamides. The reaction with a thioamide yields a thieno[3,2-d]pyrimidine with a free mercapto substituent in the 4-position; the reaction with an ester or amide yields a thieno[3,2-d]pyrimidine with a free hydroxyl group in the 4-position. The reaction with thiourea leads to thienopyrimidines with a free mercapto substituent in the 2-position. These reactions are, in general, carried out at elevated temperatures, preferably at a temperature between 100 and 200° C., and, if necessary, in the presence of an inert high-boiling-point solvent, such as toluene, xylene or tetrahydronaphthalene.

The thienopyridimines thus obtained, which have free hydroxyl substitutents in the 2- and/or 4-positions, are subsequently converted into the correspondingly halo-substituted compounds by conventional methods, such as by heating with a phosphorus oxyhalide.

Thieno[3,2-d]pyrimidines with mercapto or lower alkyl-mercapto substituents in the 2- and/or 4-position may also be obtained by reacting the correspondingly halo-substituted analogs with an alkali metal hydrogen sulfide, an alkali metal mercaptide or thiourea; they may further be obtained by reacting the correspondingly hydroxy-substituted analogs with phosphorus pentasulfide. Finally, thienopyrimidines with free mercapto substituents may be converted into the correspondingly lower alkylmercap-to-substituted analogs by alkylation, such as with a lower alkyl halide (see Examples I, J and N below).

The starting compounds of the Formula II wherein A is halogen may, for example, be prepared by reacting a 2,4-dihydroxy-thieno[3,2-d]pyrimidine, obtained by subjecting a corresponding 3-amino-thiophene-2-carboxylic acid ester to a ring closure reaction with urea, with a phosphorus oxyhalide to form a 2,4-dihalo-thieno[3,2-d] pyrimidine, and reacting the latter with a morpholine of the Formula V (see Examples A to D).

A compound of the Formula IV wherein A is halogen may be prepared by performing the ring closure reaction above referred to with thiourea or potassium thiocyanate, and subsequently alkylating the 2-mercapto-4-hydroxy-thieno[3,2-d]pyrimidine formed thereby (see Examples E and F). Thereafter, the alkylmercapto group in the 2-position is exchanged for a heterocyclic amino radical of the Formula III (see Example G), and then the hydroxyl substituent in the 4-position is replaced by a halogen (see Example H).

Compounds of the Formulas II and IV wherein A is alkylsulfonyl may be obtained, for example, by oxidation of a corresponding compound wherein A is alkylmercapto (see Examples K and L).

A compound of the Formula VI may be prepared by reacting a compound of the Formula IV wherein A is an exchangeable substituent, such as halogen, mercapto, lower alkylmercapto or lower alkylsulfonyl, with a diethanolamine of the formula

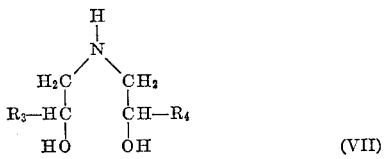

(VII)

wherein $R_3$ and $R_4$ have the same meanings as in Formula I. The reaction is generally carried out at a temperature between 20 and 150° C., preferably in an inert organic solvent or suspension medium, and in the event that A in Formula IV is halogen, also in the presence of a hydrogen halide-binding agent, such as a teritary organic amine or an excess of the diethanolamine VII. Examples of suitable solvents are lower alkanols, dimethylformamide, dimethylsulfoxide, 1-methyl-2-pyrrolidone or hexamethyl-phosphoric acid triamide (see Example M).

A compound of the Formula IV may be prepared by methods analogous to those described in German Offenlegungsschrift 1,470,356.

The following examples further illustrate the present invention and will enable others skilled in the art to understand it more completely. It should be understood, however, that the invention is not limited solely to the particular examples given below.

PREPARATION OF STARTING COMPOUNDS

Example A.—2,4-dihydroxy-thieno[3,2-d]pyrimidine 1.6 gm. (0.01 mol) of methyl 3-amino-thiophene-2-carboxylate and 3 gm. (0.05 mol) of urea were intimately admixed with each other, and the mixture was heated for two hours at 200° C. A clear, brown molten mass was formed which solidified upon standing; the solid product was dissolved in warm 1 N sodium hydroxide, and the resulting solution was decolorized with charcoal and then acidified with 2 N hydrochloric acid. The crystalline precipitate formed thereby was collected by vacuum filtration and recrystallized from water, yielding 1.2 gm. (72% of theory) of 2,4 - dihydroxy-thieno[3,2-d]pyrimidine, M.P. >300° C.

Analysis.—$C_6H_4N_2O_2S$; mol. wt. 168.18. Calculated (percent): C, 42.84; H, 2.40; N, 16.66. Found (percent): C, 42.75; H, 2.57; N, 16.82.

Using an analogous procedure, the following 2,4-dihydroxy-thieno[3,2-d]pyrimidines were also prepared:

(a) 2,4-dihydroxy-6-methyl-thieno[3,2-d]pyrimidine, M.P. >320° C., from methyl 3-amino-5-methyl-thiophene-2-carboxylate and urea;

(b) 2,4-dihydroxy-7-methyl-thieno[3,2-d]pyrimidine, M.P. >300° C., from methyl 3-amino-4-methyl-thiophene-2-carboxylate and urea;

(c) 2,4-dihydroxy-6,7-dimethyl-thieno[3,2-d]pyrimidine, M.P. >360° C., from methyl 3-amino-4,5-dimethyl-thiophene-2-carboxylate and urea; and (d) 2,4-dihydroxy-6-phenyl-thieno[3,2-d]pyrimidine, M.P. >300° C., from methyl 3-amino-5-phenyl-thiophene-2-carboxylate and urea.

Example B.—2,4-dichloro-thieno[3,2-d]pyrimidine

A mixture consisting of 8.4 gm. (0.05 mol) of 2,4-dihydroxy-thieno[3,2-]pyrimidine and 100 ml. of phosphorus oxychloride was refluxed for ten hours, whereby a clear solution was formed. Thereafter, the excess unreacted phosphorus oxychloride was evaporated in vacuo, the residual oil was poured into ice water, and the aqueous mixture was extracted with chloroform. The chloroform phase was isolated, washed with water until neutral, then dried over sodium sulfate, the chloroform was evaporated in vacuo, and the solid residue was recrystallized from ethanol. 7.6 gm. (74% of theory) of 2,4-dichloro-thieno[3,2-d]pyrimidine, M.P. 141–142° C., were obtained.

Analysis.—$C_6H_2Cl_2N_2S$; mol. wt. 205.08. Calculated (percent): C, 35.13; H, 0.98; Cl, 34.58. Found (percent): C, 35.25; H, 1.02; Cl, 34.68.

Using an analogous procedure, the following 2,4-dichloro-thieno[3,2-d]pyrimidines were also prepared:

(a) 2,4-dichloro-6-methyl-thieno[3,2-d]pyrimidine, M.P. 150° C. (recrystallized from ethanol), from 2,4-dihydroxy-6-methyl-thieno[3,2-d]pyrimidine and phosphorus oxychloride.

(b) 2,4-dichloro-7-methyl-thieno[3,2-d]pyrimidine, M.P. 186° C. (recrystallized from ethanol), from 2,4-dihydroxy-7-methyl-thieno[3,2-d]pyrimidine and phosphorus oxychloride.

(c) 2,4-dichloro - 6,7 - dimethyl-thieno[3,2-d]pyrimidine, M.P. 169° C. (recrystallized from ethylacetate), from 2,4-dihydroxy - 6,7 - dimethyl-thieno[3,2-d]pyrimidine and phosphorus oxychloride.

(d) 2,4-dichloro-6-phenyl-thieno[3,2-d]pyrimidine, M.P. 175–177° C. (recrystallized from acetone), from 2,4-dihydroxy-6-phenyl-thieno[3,2-d]pyrimidine and phosphorus oxychloride.

Example C.—2-chloro-6,7-dimethyl-4-morpholino-thieno[3,2-d]pyrimidine 7.9 gm. (0.034 mol) of 2,4-dichloro-6,7-dimethyl-thieno[3,2-d]pyrimidine were suspended in 150 ml. of absolute ethanol and, while vigorously stirring the suspension at room temperature, 8.7 gm. (0.1 mol) of morpholine were added dropwise thereto. Thereafter, the reaction mixture was stirred for two hours more at room temperature and then it was admixed with water. The precipitate formed thereby was collected by vacuum filtration, washed with water and recrystallized from petroleum ether/acetone. 8.4 gm. (87.2% of theory) of 2-chloro - 6,7 - dimethyl-4-morpholino-thieno[3,2-d]pyrimidine, M.P. 157° C., were obtained.

Analysis.—$C_{12}H_{14}ClN_3OS$; mol. wt. 283.79. Calculated (percent): C, 50.80; H, 4.97; Cl, 12.51; N, 14.87; S, 11.29. Found (percent): C, 50.60; H, 4.94; Cl, 12.50; N, 14.60; S, 11.07.

Using an analogous procedure, the following 2-chloro-4 - morpholino - thieno[3,2-d]pyrimidines were also prepared:

(a) 2-chloro-4-morpholino-6-methyl-thieno[3,2-d]pyrimidine, M.P. 180–181° C. (recrystallized from acetone), from 2,4-dichloro - 6 - methyl-thieno[3,2-d]pyrimidine and morpholine.

(b) 2-chloro-4-morpholino-7-methyl-thieno[3,2-d]pyrimidine, M.P. 128° C. (recrystallized from ethanol), from 2,4-dichloro - 7 - methyl - thieno[3,2-d]pyrimidine and morpholine.

(c) 2-chloro-4-(2'-methyl-morpholino)-thieno[3,2-d]pyrimidine, M.P. 169–171° C. (recrystallized from ethanol), from 2,4-dichloro-thieno[3,2-d]pyrimidine and 2-methyl-morpholine.

(d) 2-chloro-4-morpholino-6-phenyl-thieno[3,2-d]pyrimidine, M.P. 183–185° C. (recrystalized from acetone), from 2,4-dichloro - 6 - phenyl-thieno[3,2-d]pyrimidine and morpholine.

(e) 2-chloro-4-(2',6'-dimethyl-morpholino)-thieno[3,2-d]pyrimidine, M.P. 144–146° C. (recrystallized from ethanol), from 2,4-dichloro-thieno[3,2-d]pyrimidine and 2,6-dimethyl-morpholine.

Example D.—2-chloro-4-morpholino-thieno[3,2-d]pyrimidine 5.1 gm. 0.025 mol) of 2,4-dichloro-thieno[3,2-d]pyrimidine were suspended in 200 ml. of absolute ethanol and, while vigorously stirring the resulting suspension and maintaining its temperature at 20° C. by exterior cooling, 4.8 gm. (0.055 mol) of morpholine were added thereto. A clear solution was formed, from which a crystalline precipitate separated out after a short time. The reaction mixture was stirred for two hours more at room temperature, then vacuum-filtered, and the filter cake was washed with water and ethanol and subsequently recrystallized from methyl ethyl ketone. 5.75 gm. (90% of theory) of 2-chloro-4-morpholino-thieno[3,2-d]pyrimidine, M.P. 196–198° C., were obtained.

Analysis.—$C_{10}H_{10}ClN_3OS$; mol. wt. 255.74. Calculated (percent): C, 46.97; H, 3.95; N, 16.44. Found (percent): C, 47.10; H, 4.03; N, 16.30.

Example E.—2-mercapto-4-hydroxy-thieno[3,2-d] pyrimidine

A solution of 19.4 gm. (0.2 mol) of potassium thiocyanate in 20 ml. of water was added dropwise over a period of 30 minutes to a stirred solution of 15.7 gm. (0.1 mol) of methyl 3-amino-thiophene-2-carboxylate in 150 ml. of aqueous 8% hydrochloric acid at 70° C. White crystals separated out instantaneously. After all of the thiocyanate solution had been added, the reaction mixture was heated for 2½ hours at 95° C., then vacuum-filtered, and the crystalline filter cake was dissolved in 250 ml. of hot 2 N sodium hydroxide. The resulting solution was allowed to cool and was then acidified with glacial acetic acid, whereupon a precipitate was formed which was vacuum-filtered off, washed with water and dried. 14.9 gm. (81% of theory) of analytically pure 2-mercapto-4-hydroxy-thieno[3,2-d]pyrimidine, M.P. >300° C., were obtained.

Analysis.—$C_6H_4N_2OS_2$; mol. wt. 184.25. Calculated (percent): C, 39.12; H, 2.19. Found (percent): C, 39.20; H, 2.21.

Example F.—2-ethylmercapto-4-hydroxy-thieno-[3,2-d]pyrimidine

A solution of 10.0 gm. (0.055 mol) of 2-mercapto-4-hydroxy-thieno[3,2-d]pyrimidine in 50 ml. of sodium hydroxide was slowly admixed at 50° C. with 30.0 gm. (0.275 mol) of ethyl bromide, while stirring. Thereafter, the reaction mixture was refluxed for two hours, then allowed to cool, and the resulting clear solution was acidified with glacial acetic acid. The crystalline precipitate formed thereby was collected by vacuum filtration, washed with water and recrystallized from ethanol. 9.0 gm. (77% of theory) of 2-ethylmercapto-4-hydroxy-thieno[3,2-d] pyrimidine, M.P. 201–203° C., were obtained.

Analysis.—$C_8H_8N_2OS_2$; mol. wt. 212.30. Calculated (percent): C, 45.26; H, 3.80; S, 30.21. Found (percent): C, 45.40; H, 3.85; S, 30.13.

Example G.—2-(4'-carbethoxy-piperazino)-4-hydroxy-thieno[3,2-d]pyrimidine

A mixture consisting of 2.1 gm. (0.01 mol) of 2-ethyl-mercapto-4-hydroxy-thieno[3,2-d]pyrimidine and 7.9 gm. (0.05 mol) of 1-carbethoxy-piperazine was heated at 150° C. for seven hours. Thereafter, the reaction mixture was allowed to cool and was then admixed with 50 ml. of ethanol, whereby an initially clear solution was formed, from which a crystalline substance precipitated after a short period of time. The precipitate was collected by vacuum filtration, washed with ether and recrystallized from ethanol. 18 gm. (59% of theory) of 2-(4'-carbethoxy-piperazino)-4-hydroxy-thieno[3,2-d]pyrimidine, M.P. 208–210° C., were obtained.

Example H.—2-(4'-carbethoxy-piperazino)-4-chloro-thieno[3,2-d]pyrimidine

A mixture consisting of 1.5 gm. (0.005 mol) of 2-(4'-carbethoxy-piperazino)-4-hydroxy-thieno[3,2-d]pyrimidine and 10 ml. of phosphorus oxychloride was refluxed for three hours. Thereafter, the excess unreacted phosphorus oxychloride was evaporated in vacuo, the oily residue was poured into ice water, and the aqueous mixture was extracted with chloroform. The extract solution was dried over sodium sulfate, and the chloroform was evaporated, leaving a viscous residue which crystallized after a short time and was then recrystallized from ethanol. 1.1 gm. (68% of theory) of 2-(4'-carbethoxy-piperazino)-4-chloro-thieno[3,2-d]pyrimidine, M.P. 168–170° C. (decomp.), were obtained.

Example I.—2-methylmercapto-4-morpholino-thieno [3,2-d]pyrimidine

Gaseous methylmercaptan, freshly generated from 6.0 gm. of S-methyl-isothiourea sulfate and 10 ml. of 5 N sodium hydroxide, was introduced into 15 ml. of ethanolic IM sodium hydroxide, and the resulting soltuion was added dropwise over a period of 5 minutes to a boiling solution of 2.6 gm. (0.01 mol) of 2-chloro-4-morpholino-thieno [3,2-d]pyrimidine in 25 ml. of ethanol. The reaction mixture was then allowed to stand for 30 minutes and was then cooled to room temperature while passing carbon dioxide therethrough. Subsequently, the ethanol was evaporated under reduced pressure, and the precipitate formed thereby was collected by vacuum filtration, washed with water, dried and recrystallized from methanol. 2.4 gm. (90% of theory) of 2-methylmercapto-4-morpholino-thieno[3,2-d]pyrimidine, M.P. 138–139° C., were obtained.

Analysis.—$C_{11}H_{13}N_3OS_2$; mol. wt. 267.38. Calculated (percent): C, 49.41; 4.90; S, 23.99. Found (percent): C, 49.50; H, 4.99; S, 23.85.

Example J.—2-(4'-carbethoxy-piperazino)-4-methyl-mercapto-thieno[3,2-d]pyrimidine 3.2 gm. (0.01 mol) of 2-(4'-carbethoxy-piperazino)-4-mercapto-thieno[3,2-d]pyrimidine were dissolved in 30 ml. of 0.5 N potassium hydroxide, the resulting solution was cooled to 0° C. and, while stirring it at that temperature, 2.1 gm. (0.015 mol) of methyl iodide were added dropwise thereto. After some time a crystalline product separated out. The reaction mixturue was allowed to stand for one hour at 25° C., and the crystalline precipitate was collected by vacuum filtration, washed with water and recrystallized from ethanol. 2.5 gm. (74% of theory) of 2-(4'-carbethoxy-piperazino)-4-methylmercapto-thieno [3,2-d]pyrimidine, M.P. 110–111° C., were obtained.

Analysis.—$C_{14}H_{18}O_2S_2$; mol. wt. 338.46. Calculated (percent): C, 49.67; H, 5.36; N, 16.55. Found (percent): C, 49.60; H, 5.34; N, 16.70.

Example K.—2-methylsulfonyl-4-morpholino-thieno [3,2-d]pyrimidine

A solution of 3.5 gm. (0.022 mol) of potassium permanganate in 25 ml. of water was added dropwise over a period of 15 minutes to a solution of 2.7 gm. (0.01 mol) of 2-methylmercapto-4-morpholino-thieno[3,2-d]pyrimidine in 25 ml. of glacial acetic acid at 25° C., and the resulting mixture was stirred for three hours at 25° C. Thereafter, the reaction solution was decolorized with aqueous sodium bisulfite, then admixed with sodium hydroxide until alkaline reaction, and extracted several times with methylene chloride. The combined extracts were washed with water, dried over sodium sulfate, and evaporated in vacuo, and the residue was recrystallized from ethanol. 1.84 gm. (62% of theory) of 2-methylsulfonyl-4-morpholino-thieno[3,2-d]pyrimidine, M.P. 191–193° C., were obtained.

Analysis.—$C_{11}H_{13}N_3O_3S_2$; mol. wt. 299.38. Calculated (percent): C, 44.12; H, 4.38; N, 14.03. Found (percent): C, 44.19; H, 4.44; N, 13.90.

Example L.—2-(4'-carbethoxy-piperazino)-4-methyl-sulfonyl-thieno[3,2-d]pyrimidine 3.4 gm. (0.01 mol) of 2-(4'-carbethoxy-piperazino)-4-methylmercapto-thieno[3,2-d]pyrimidine were dissolved in 100 ml. of a 1:1-mixture of glacial acetic acid and acetic acid anhydride, the resutling solution was admixed at 25°

C. with 2.3 gm. (0.02 mol) of aqueous 30% hydrogen peroxide, and the mixture was allowed to stand at 25° C. for two hours. Thereafter, the reaction mixture was evaporated to dryness in vacuo, and the solid residue was triturated with petroleum ether, vacuum-filtered and dried at 70° C. in vacuo. 3.1 gm. (84% of theory) of 2-(4'-carbethoxy-piperazino) - 4 - methylsulfonyl-thieno[3,2-d]pyrimidine, M.P. 142–144° C., were obtained.

Example M.—4-diethanolamino-2-piperazino-thieno [3,2-d]pyrimidine monohydrochloride A mixture consisting of 5 gm. (0.0183 mol) of 2-chloro - 4-diethanolamino-thieno[3,2-d]pyrimidine (M.P. 144–145° C.; prepared from 2,4-dichloro-thieno[3,2-d]pyrimidine and diethanolamine) and 6.5 gm. (0.075 mol.) of piperazine was heated for 30 minutes at 140° C. Thereafter, the reaction mixture was allowed to cool and was then admixed with a 9:1-mixture of methanol and ammonia. The mixture was purified by column chromatography (adsorbent: silicagel, particle size 0.2–0.5 mm.; flow agent: methanol/ammonia=9:1), the uniform fractions were combined and evaporated to dryness, and the residue was recrystallized from isopropanol/water. 4.28 gm. (65.2% of theory) of 4 - diethanolamino-2-piperazino-thieno[3,2-d]pyrimidine hydrochloride, M.P. 229–232° C., were obtained.

Analysis.—$C_{14}H_{21}N_5O_2S \cdot HCl$; mol. wt. 359.89. Calculated (percent): C, 46.72; H, 6.16; Cl, 9.85; N, 19.46; S, 8.91. Found (percent): C, 47.00; H, 6.14; Cl, 9.65; N, 19.35; S, 8.70.

(a) Using an analogous procedure, 4-diethanolamino-6-methyl-2-piperazino - thieno[3,2-d]pyrimidine hydrochloride, M.P. 164–166° C. (recrystallized from water), was prepared from 2-chloro-4-diethanolamino-6-methyl-thieno[3,2-d]pyrimidine (M.P. 159–161° C.) and piperazine.

Example N.—2-(4'-carbethoxy-piperazino)-4-mercapto-thieno[3,2-d]pyrimidine

A mixture consisting of 3.1 gm. (0.01 mol) of 2-(4'-carbethoxy-piperazino)-4-hydroxy - thieno[3,2-d]pyrimidine, 2.5 gm. (0.011 mol) of phosphorus pentasulfide and 25 ml. of absolute pyridine was refluxed for four hours. Thereafter, the clear reaction solution was evaporated to dryness in vacuo, the residue was admixed with 20 ml. of water, and the aqueous mixture was boiled for one hour and then cooled to 5° C. 2 N sodium hydroxide was added until the pH was 12, the resulting alkaline solution was filtered through activated charcoal, and the filtrate was acidified with glacial acetic acid. The precipitate formed thereby was collected by vacuum filtration, washed with water and recrystallized from ethanol. 1.6 gm. (49% of theory) of 2-(4'-carbethoxy-piperazino)-4-mercapto-thieno[3,2-d]pyrimidine, M.P. 202–204° C., were obtained.

Analysis.—$C_{13}H_{16}N_4O_2S_2$; mol. wt. 324.43. Calculated (percent): C, 48.13; H, 4.97; S, 19.77. Found (percent): C, 48.10; H, 4.91; S, 19.70.

PREPARATION OF END PRODUCTS OF THE FORMULA I

Example 1.—4-morpholino-2-piperazino-thienol[3,2-d] pyrimidine and its dihydrochloride by method A A mixture consisting of 10.2 gm. (0.04 mol) of 2-chloro-4-morpholino-thieno[3,2-d]pyrimidine, 15.6 gm. (0.08 mol) of piperazine hexahydrate and 100 ml. of absolute ethanol was heated for three hours at 120° C. in a closed pressure vessel. Thereafter, the reaction mixture was allowed to cool, the ethanol was evaporated in vacuo, and the residue was dissolved in water. The pH of the aqueous solution was adjusted to 6 by addition of 2 N hydrochloric acid, and then it was extracted three times with chloroform. The pH of the aqueous phase was adjusted to 12 with aqueous 30% sodium hydroxide, and then it was extracted three times with methylene chloride. The combined methylene chloride extracts were dried over sodium sulfate and evaporated to dryness, and the non-crystalline residue was purified by column-chromatography (adsorbent: silicagel, particle size 0.2–0.5 mm.; flow agent: benzene/acetone=7:3). The uniform fractions were combined, evaporated to dryness, the non-crystalline residue, 2-piperazino-4-morpholino-thieno[3,2-d]pyrimidine, was dissolved in absolute ethanol, the resulting solution was acidified with ethereal hydrochloric acid, and the precipitate formed thereby was collected by vacuum filtration, washed with ether and recrystallized from absolute ethanol. 2.9 gm. (19% of theory) of the compound of the formula

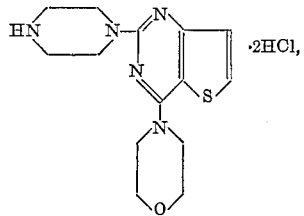

M.P. 175° C. (decomp.), were obtained.

Analysis.—$C_{14}H_{19}N_5OS \cdot 2HCl$; mol. wt. 378.34. Calculated (percent): C, 44.44; H, 6.50; N, 18.51; Cl, 18.75. Found (percent): C, 44.15; H, 5.71; N, 18.30; Cl, 18.51.

Example 2.—4-morpholino-2-piperazino-thieno[3,2-d] pyrimidine and its dihydrochloride by method A (a) A mixture consisting of 2.6 gm. (0.01 mol) of 2-chloro-4-morpholino-thieno[3,2-d]pyrimidine and 6.3 gm. (0.04 mol) of 1-carbethoxy-piperazine was heated for three hours at 120° C. Thereafter, the resulting reaction solution was allowed to cool and was then poured into ice water, whereby a greasy precipitate was formed which was triturated until crystalline, collected by vacuum filtration and recrystallized from ethanol, yielding 3.2 gm. (86% of theory) of 2-(4'-carbethoxy-piperazino)-4-morpholino-thieno[3,2-d]pyrimidine, M.P. 139–140° C.

(b) A mixture consisting of 1.9 gm. (0.005 mol) of 2-(4'-carbethoxy-piperazino)-4 - morpholino-thieno[3,2-d]pyrimidine and 20 ml. of concentrated hydrochloric acid was refluxed for 10 hours. Thereafter, the resulting reaction solution was allowed to cool, was then poured over ice, and the aqueous mixture was made strongly alkaline with aqueous 30% sodium hydroxide and then extracted several times with methylene chloride. The combined extracts were dried over sodium sulfate, evaporated to dryness, and the non-crystalline residue, 2-piperazino-4 - morpholino-thieno[3,2-d]pyrimidine, was taken up in absolute ethanol. The resulting solution was acidified with ethereal hydrochloric acid, and the precipitate formed thereby was collected by vacuum filtration, washed with ether and recrystallized from absolute methanol, yielding 1.2 gm. (63% of theory) of 2-piperazino-4-morpholino - thieno[3,2-d]pyrimidine dihydrochloride, M.P. 175° C. (decomp.).

Example 3.—4-morpholino-2-piperazino-thieno[3,2-d] pyrimidine and its dihydrochloride by method B (a) A mixture consisting of 3.26 gm. (0.01 mol) of 2-(4'-carbethoxy-piperazino) - 4 - chloro-thieno[3,2-d]pyrimidine and 15 ml. of morpholine was refluxed (130° C.) for one hour. Thereafter, the excess unreacted morpholine was distilled off in vacuo, the residue was admixed with water, the aqueous mixture was vacuum-filtered, and the filter cake was washed with water and recrystallized from ethanol, yielding 2.8 gm. (74% of theory) of 2-(4'-carbethoxy-piperazino)-4-morpholino-thieno[3,2-d]pyrimidine, M.P. 139–141° C.

(b) A mixture consisting of 1.9 gm. (0.005 mol) of 2-(4'-carbethoxy-piperazino) - 4 - morpholino - thieno [3,2-d]pyrimidine and 20 ml. of concentrated hydrochloric acid was refluxed for 10 hours. Thereafter, the resulting reaction solution was allowed to cool, was then poured over ice, and the aqueous mixture was made strongly alkaline with aqueous 30% sodium hydroxide and then extracted several times with methylene chloride. The combined extracts were dried over sodium sulfate, evaporated to dryness, and the non-crystalline residue, 2-piperazino-4-morpholino - thieno[3,2-d]pyrimidine, was taken up in absolute ethanol. The resulting solution was acidified with ethereal hydrochloric acid, and the precipitate formed thereby was collected by vacuum filtration, washed with ether and recrystallized from absolute methanol, yielding 1.2 gm. (63% of theory) of 2-piperazino-4-morpholino-thieno[3,2-d]pyrimidine dihydrochloride, M.P. 175° C. (decomp.).

Example 5.—4-morpholino-2-piperazino-thieno[3,2-d] pyrimidine and its dihydrochloride by method A (a) A mixture consisting of 2.7 gm. (0.01 mol) of 2-methylmercapto - 4 - morpholino-thieno[3,2-d]pyrimidine (M.P. 138–139° C.) and 11.4 gm. (0.1 mol) of 1-formyl-piperazine was heated for ten hours at 150° C. Thereafter, the resulting reaction solution was allowed to cool and was then poured into water, whereby a greasy precipitate was formed which was made to crystallize by scratching with a glass rod. The crystalline product was collected by vacuum filtration and recrystallized from ethanol, yielding 1.8 gm. (54% of theory) of 2-(4'-formyl-piperazino)-4-morpholino - thieno[3,2-d]pyrimidine, M.P. 139° C. (decomp.).

(b) A mixture consisting of 1.6 gm. (0.005 mol) of 2-(4'-formyl-piperazino) - 4 - morpholino-thieno[3,2-d] pyrimidine and 20 ml. of concentrated hydrochloric acid was refluxed for nine hours. Thereafter, the resulting reaction solution was allowed to cool and was then poured over ice, the aqueous mixture was made alkaline with aqueous 30% sodium hydroxide and was then extracted several times with methylene chloride. The combined extracts were dried over sodium sulfate, the methylene chloride was distilled off in vacuo, and the non-crystalline residue, 4-morpholino-2-piperazino-thieno[3,2-d]pyrimidine, was taken up in absolute ethanol. The resulting solution was made alkaline with ethereal hydrochloric acid, and the precipitate formed thereby was collected by vacuum filtration, washed with ether and recrystallized from ethanol, yielding 1.35 gm. (71% of theory) of 4-morpholino-2-piperazino-thieno[3,2-d]pyrimidine dihydrochloride, M.P. 175° C. (decomp.).

Example 4.—6,7-dimethyl-4-morpholino-2-piperazino-thieno[3,2-d]pyrimidine by method A A mixture consisting of 4.25 gm. (0.015 mol) of 2-chloro-6,7-dimethyl - 4 - morpholino-thieno[3,2-d]pyrimidine and 30 gm. (0.35 mol) of anhydrous piperazine was heated for one hour at 130° C., while stirring. Thereafter, the reaction mixture was allowed to cool, was then admixed with water, and the aqueous mixture was extracted twice with methylene chloride. The combined extracts were dried over sodium sulfate, evaporated to dryness, and the residue was purified by column-chromatography (adsorbent: silicagel, particle size 0.2–0.5 mm.; flow agent: benzene/acetone/methanol/ammonia=60:25:15:1). The uniform fractions were combined, evaporated, and the residue was recrystallized from ethylacetate/petroleum ether (1:1), yielding 3.8 gm. (76% of theory) of the compound of the formula

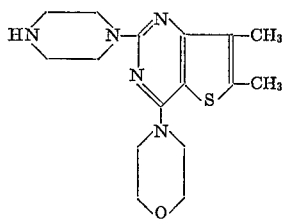

having a melting point of 156° C.

Analysis.—$C_{16}H_{23}N_5OS$; mol. wt. 333.47. Calculated (percent): C, 57.60; H, 6.96%; N, 21.00; S, 9.61. Found (percent): C, 57.80; H, 6.89; N, 20.70; S, 9.53.

Example 6

Using a procedure analogous to that described in Example 4, 6,7 - dimethyl-2-(1',4'-diazacycloheptano)-4-morpholino-thieno[3,2-d]pyrimidine of the formula

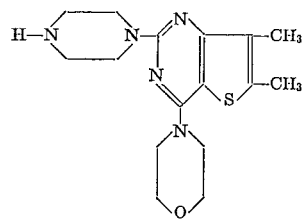

was prepared from 2-chloro-6,7-dimethyl-4-morpholino-thieno[3,2-d]pyrimidine and 1,4-diazacycloheptane.

Its dihydrochloride had a melting point of 283° C. (decomp.; recrystallized from isopropanol).

Example 7

Using a procedure analogous to that described in Example 4, 6-methyl-4-morpholino-2-piperazino-thieno[3,2-d] pyrimidine of the formula

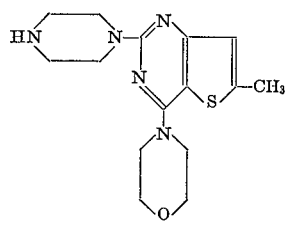

was prepared from 2-chloro-6-methyl - 4 - morpholino-thieno[3,2-d]pyrimidine and piperazine.

Its dihydrochloride had a melting point of 291–293° C. (decomp.; recrystallized from ethanol).

Example 8

Using a procedure analogous to that described in Example 4, 2-(1',4'-diazacycloheptano)-6-methyl - 4 - morpholino-thieno[3,2-d]pyrimidine was prepared from 2-chloro-6-methyl - 4 - morpholino-thieno[3,2-d]pyrimidine and 1,4-diazacycloheptane.

Its dihydrochloride had a melting point of 185° C. (decomp.; recrystallized from ethanol).

Example 9

Using a procedure analogous to that described in Example 4, 7-methyl-4-morpholino - 2 - piperazino-thieno[3,2-d]pyrimidine, M.P. 92–93° C. (recrystallized from petroleum ether/ethyl acetate 1:1), was prepared from 2-chloro-7-methyl - 4 - morpholino-thieno[3,2-d]pyrimidine and piperazine.

Example 10

Using a procedure analogous to that described in Example 4, 2-(1',4'-diazacycloheptano)-7-methyl - 4 - morpholino-thieno[3,2-d]pyrimidine was prepared from 2-chloro-7-methyl - 4 - morpholino-thieno[3,2-d]pyrimidine and 1,4-diazacycloheptane.

Its dihydrochloride had a melting point of 273–275° C. (decomp.; recrystallized from ethanol).

Example 11

Using a procedure analogous to that described in Example 4, 4-morpholino-2-piperazino - 6 - phenyl - thieno[3,2-d]pyrimidine of the formula

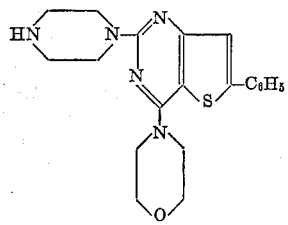

was prepared from 2-chloro - 4 - morpholino - 6 - phenyl-thieno[3,2-d]pyrimidine and piperazine.

Its dihydrochloride had a melting point of 298–300° C. (recrystallized from aqueous 90% ethanol).

Example 12

Using a procedure analogous to that described in Example 4, 2-(2',5'-dimethyl-piperazino) - 4 - morpholino-thieno[3,2-d]pyrimidine of the formula

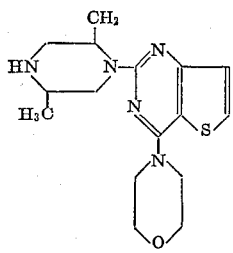

was prepared from 2 - chloro-4-morpholino-thieno[3,2-d]pyrimidine and 2,5-dimethyl-piperazine.

Its dihydrochloride had a melting point of 250–255° C. (decomp.; recrystallized from isopropanol).

Example 13

Using a procedure analogous to that described in Example 4, 4-(2'-methyl-morpholino)-2-piperazino - thieno[3,2-d]pyrimidine of the formula

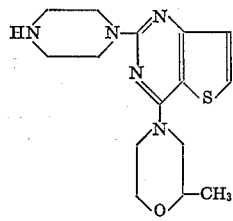

was prepared from 2-chloro - 4 - (2'-methyl-morpholino)-thieno[3,2-d]pyrimidine and piperazine.

Its dihydrochloride had a melting point of 220° C. (decomp.; recrystallized from ethanol).

Example 14

Using a procedure analogous to that described in Example 4, 4-(2',6' - dimethylmorpholino)-2-piperazino-thieno[3,2-d]pyrimidine of the formula

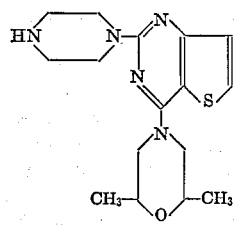

was prepared from 2-chloro-4-(2',6'-dimethyl-morpholino)-thieno[3,2-d]pyrimidine and piperazine.

Its dihydrochloride had a melting point of 264° C. (decomp.; recrystallized from ethanol).

Example 15

Using a procedure analogous to that described in Example 4, 2 - (1',4' - diazacycloheptano)-4-morpholino-thieno[3,2-d]pyrimidine was prepared from 2-chloro-4-morpholino-thieno[3,2-d]pyrimidine and 1,4-diazacycloheptane.

Its dihydrochloride had a melting point of 290° C. (decomp.; recrystallized from ethanol).

Example 16.—4-(2'-methyl-morpholino)-2-piperazino-thieno[3,2-d]pyrimidine dihydrochloride by method B (a) A mixture consisting of 3.26 gm. (0.01 mol) of 2-(4'-carbethoxy-piperazino) - 4 - chloro-thieno[3,2-d]pyrimidine and 15 ml. of 2-methyl-morpholine was refluxed for one hour. Thereafter, the excess unreacted 2-methyl-morpholine was distilled off in vacuo, the residue was admixed with water, the resulting aqueous mixture was vacuum-filtered, and the filter cake was washed with water and recrystallized from ethanol, yielding 2.6 gm. (67% of theory) of 2-(4'-carbethoxy-piperazino)-4-(2''-methyl-morpholino)-thieno[3,2-d]pyrimidine, M.P. 121–123° C.

(b) A mixture consisting of 1.95 gm. (0.005 mol) of 2 - (4' - carbethoxy-piperazino)-4-(2''-methyl-morpholino)-thieno[3,2-d]pyrimidine and 20 ml. of concentrated hydrochloric acid was refluxed for 15 hours. Thereafter, the resulting reaction solution was allowed to cool, was then poured over ice, and the aqueous mixture was made strongly alkaline with aqueous 30% sodium hydroxide and then extracted several times with methylene chloride. The combined extracts were dried over sodium sulfate, acidified with ethereal hydrochloric acid, and the precipitate formed thereby was collected by vacuum filtration, washed with ether and recrystallized from absolute ethanol, yielding 1.45 (74% of theory) of 2-piperazino-4-(2'-methyl-morpholino)-thieno[3,2 - d]pyrimidine dihydrochloride, M.P. 220° C. (decomp.).

*Analysis.*—$C_{15}H_{23}Cl_2N_5OS$; mol. wt. 392.35. Calculated (percent): C, 45.90; H, 5.90; N, 17.83. Found (percent): C, 45.81; H, 6.01; N, 17.75.

Example 17

Using a procedure analogous to that described in Example 16, 6 - methyl-4-morpholino-2-piperazino-thieno[3,2-d]pyrimidine dihydrochloride, M.P. 291–293° C. (decomp.; recrystallized from absolute ethanol), was prepared by reacting 2-(4'-carbethoxy-piperazino)-4-chloro-6-methyl-thieno[3,2-d]pyrimidine with morpholine, followed by hydrolysis and decarboxylation of the reaction product with concentrated hydrochloric acid.

Example 18.—4-morpholino-2-piperazino-thieno[3,2-d]pyrimidine and its dihydrochloride by method C 3.6 gm. (0.01 mol) of 4-diethanolamino-2-piperazino-thieno[3,2-d]pyrimidine hydrochloride were dissolved in 40 ml. of fuming sulfuric acid, and the solution was allowed to stand for three days at 20° C. under exclusion of moisture. Thereafter, the reaction mixture was poured into ice water, and the resulting aqueous mixture was made strongly alkaline with aqueous 40% sodium hydroxide and was then extracted several times with methylene chloride. The combined extracts were washed with water, dried over sodium sulfate, the methylene chloride was drawn off in vacuo, and the residue, 4-morpholino-2-piperazino-thieno[3,2-d]pyrimidine, was taken up in absolute ethanol. The resulting solution was acidified with ethereal hydrochloric acid, and the precipitate formed thereby was collected by vacuum-filtration, washed with ether and recrystallized from absolute ethanol, yielding 0.4 gm. (12% of theory) of 4-morpholino-2-piperazino-thieno[3,2-d]pyrimidine dihydrochloride, M.P. 175° C. (decomp.).

*Analysis.*—$C_{14}H_{21}Cl_2N_5OS$; mol. wt. 378.34. Calculated (percent): C, 44.44; H, 5.60; N, 18.51; Cl, 18.75. Found (percent): C, 44.20; H, 5.75; N, 18.25; Cl, 18.60.

Example 19

Using a procedure analogous to that described in Example 18, 6 - methyl-4-morpholino-2-piperazino-thieno[3,2-d]pyrimidine was prepared from 4-diethanolamino-6 - methyl - 2 - piperazino-thieno[3,2-d]pyrimidine and fuming sulfuric acid.

Its dihydrochloride had a melting point of 291–293° C. (decomp.; recrystallized from ethanol).

Example 20.—4-morpholino-3-piperazino-thieno[3,2-d]pyrimidine and its dihydrochloride by method B (a) 3.2 gm. (0.01 mol) of 2-(4'-carbethoxy-piperazino)-4-mercapto-thieno[3,2-d]pyrimidine and 0.87 gm. (0.01 mol) of morpholine were dissolved in 20 ml. of dimethylsulfoxide, and the solution was heated for three hours at 150° C. Thereafter, the reaction solution was allowed to cool, was then poured into water, and the aqueous mixture was extracted with methylene chloride. The organic extract was dried over sodium sulfate, evaporated in vacuo, and the residue was recrystallized from ethanol, yielding 0.87 gm. (23% of theory) of 2-(4'-carbethoxy - piperazino) - 4 - morpholino - thieno[3,2-d]pyrimidine, M.P. 139–141° C.

(b) A mixture consisting of 1.9 gm. (0.005 mol) of 2-(4' - carbethoxy - piperazino) - 4 - morpholino - thieno-[3,2-d]pyrimidine and 20 ml. of concentrated hydrochloric acid was refluxed for ten hours. Thereafter, the resulting reaction solution was allowed to cool, was then poured over ice, and the aqueous mixture was made strongly alkaline with aqueous 30% sodium hydroxide and then extracted several times with methylene chloride. The combined extracts were dried over sodium sulfate, evaporated to dryness, and the non-crystalline residue, 2-piperazino-4-morpholino-thieno[3,2-d]pyrimidine, was taken up in absolute ethanol. The resulting solution was acidified with ethereal hydrochloric acid, and the precipitate formed thereby was collected by vacuum filtration, washed with ether and recrystallized from absolute methanol, yielding 1.2 gm. (63% of theory) of 2-piperazino-4-morpholino - thieno[3,2-d]pyrimidine dihydrochloride, M.P. 175° C. (decomp.).

Example 21.—4-morpholino-2-piperazino-thieno[3,2-d]pyrimidine and its dihydrochloride by method B (a) 3.4 gm. (0.01 mol) of 2-(4'-carbethoxy-piperazino) 4-methylmercapto-thieno[3,2-d]pyrimidine and 0.87 gm. 0.01 mol) of morpholine were dissolved in 20 ml. of dimethylsulfoxide, and the solution was heated for two hours at 150° C. Thereafter, the reaction solution was allowed to cool, was then poured into water, and the aqueous mixture was extracted with methylene chloride. The organic extract was dried over sodium sulfate, evaporated in vacuo, and the residue was recrystallized from ethanol, yielding 2.7 gm. (72% of theory) of 2-(4'-carbethoxy - piperazino) - 4 - morpholino - thieno[3,2-d]pyrimidine, M.P. 139–141° C.

(b) A mixture consisting of 1.9 gm. (0.005 mol) of 2-(4' - carbethoxy - piperazino) - 4 - morpholino - thieno [3.2-d]pyrimidine and 20 ml. of concentrated hydrochloric acid was refluxed for ten hours. Thereafter, the resulting reaction solution was allowed to cool, was then poured over ice, and the aqueous mixture was made strongly alkaline with aqueous 30% sodium hydroxide and then extracted several times with methylene chloride. The combined extracts were dried over sodium sulfate, evaporated to dryness, and the non-crystalline residue, 2-piperazino - 4 - morpholino - thieno[3,2-d]pyrimidine, was taken up in absolute ethanol. The resulting solution was acidified with ethereal hydrochloric acid, and the precipitate formed thereby was collected by vacuum filtration, washed with ether and recrystallized from absolute methanol, yielding 1.2 gm. (63% of theory) of 2-piperazino - 4 - morpholino - thieno[3,2-d]pyrimidine dihydrochloride, M.P. 175° C. (decomp.).

Example 22.—4-morpholino-2-piperazino-thieno[3,2-d]pyrimidine and its dihydrochloride by method A (a) A mixture consisting of 3.0 gm. (0.01 mol) of 2-methylsulfonyl - 4 - morpholino-thieno[3,2-d]pyrimidine and 6.3 gm. (0.04 mol) of 1-carbethoxy-piperazine was heated for 2 hours at 80° C. Thereafter, the warm reaction mixture was poured into ice water, whereby a greasy precipitate was formed which crystallized throughout upon standing for a few hours. The crystalline product was collected by vacuum filtration and recrystallized from ethanol, yielding 3.4 gm. (90% of theory) of 2-(4'-carbethoxy - piperazino) - 4 - morpholino - thieno[3,2-d]pyrimidine, M.P. 139–141° C.

(b) A mixture consisting of 1.9 gm. (0.005 mol) of 2-(4'-carbethoxy-piperazino)-4-morpholino - thieno[3,2-d]pyrimidine and 20 ml. of concentrated hydrochloric acid was refluxed for ten hours. Thereafter, the resulting reaction solution was allowed to cool, was then poured over ice, and the aqueous mixture was made stongly alkaline with aqueous 30% sodium hydroxide and then extracted several times with methylene chloride. The combined extracts were dried over sodium sulfate, evaporated to dryness, and the non-crystalline residue, 2-piperazino-4-morpholino-thieno[3,2-d]pyrimidine, was taken up in absolute ethanol. The resulting solution was acidified with ethereal hydrochloric acid, and the precipitate formed thereby was collected by vacuum filtration, washed with ether and recrystallized from absolute methanol, yielding 1.2 gm. (63% of theory) of 2-piperazino-4-morpholino-thieno[3,2-d]pyrimidine dihydrochloride, M.P. 175° C. (decomp.).

Example 23.—4-morpholino-2-piperazino-thieno[3,2-d]pyrimidine and its dihydrochloride by method B (a) A mixture consisting of 1.85 gm. (0.005 mol) of 2-(4'-carbethoxy-piperazino) - 4 - methylsulfonyl-thieno-[3,2-d]pyrimidine and 5 ml. of morpholine was heated for 30 minutes at 80° C. Thereafter, the reaction mixture was poured into ice water, and the precipitate formed thereby was collected by vacuum filtration, washed with water and recrystallized from ethanol, yielding 0.92 gm. (49% of theory) of 2-(4'-carbethoxy-piperazino)-4-morpholino-thieno[3,2-d]pyrimidine, M.P. 139–141° C.

(b) A mixture consisting of 1.9 gm. (0.005 mol) of 2-(4'-carbethoxy-piperazino) - 4 - morpholino - thieno-[3,2-d]pyrimidine and 20 ml. of concentrated hydrochloric acid was refluxed for ten hours. Thereafter, the resulting reaction solution was allowed to cool, was then poured over ice, and the aqueous mixture was made strongly alkaline with aqueous 30% sodium hydroxide and then extracted several times with methylene chloride. The combined extracts were dried over sodium sulfate, exaporated to dryness, and the non-crystalline residue, 2-piperazino-4-morpholino-thieno[3,2-d]pyrimidine, was taken up in absolute ethanol. The resulting solution was acidified with ethereal hydrochloric acid, and the precipitate formed thereby was collected by vacuum filtration, washed with ether and recrystallized from absolute methanol, yielding 1.2 gm. (63% of theory) of 2-piperazino - 4 - morpholino-thieno[3,2-d]pyrimidine dihydrochloride, M.P. 175° C. (decomp.).

The compounds according to the present invention, that is, those embraced by Formula I and their non-toxic, pharmacologically accpetable acid addition salts, have useful pharmacodynamic properties. More particularly, the compounds of the present invention very effectively inhibit the aggregation of thrombocytes in blood and blood plasma at a concentration of less than $10^{-5}$ mol/liter.

The thrombocyte aggregation inhibiting action of the compounds of the instant invention was ascertained by the standard test method of Born and Cross, Journal of Physiology 170, 397 (1964). The aggregation of thrombocytes was measured in platelet-rich blood plasma taken from healthy human test subjects by photometrically measuring and registering the course of decrease in the optical density of the platelet suspension upon addition of adenosine diphosphate. In each case the compound under investigation was added 10 minutes prior to addition of the adenoside diphosphate.

The inhibiting action upon thromboctyte aggregation was also determined by the test method of Morris (1. Internationales Symposium über Stoffwechsel und Membranpermeabilität von Erythrozyten und Thrombozyten, Vienna, Austria, 1968, E. Deutsch, E. Gerlach, K. Moser; published by Georg Thieme Verlag, Stuttgart, Germany). Human citrate-blood was brought in contact with 1 gm. of glass pearls for 30 seconds. Thereafter, the blood was allowed to stand for one hour to permit desaggregation of the reversible aggregates. The platelets in the supernatant platelet-rich plasma were microscopically counted before and after contact with the glass pearls.

In both of these tests, the thrombocyte aggregation inhibiting activity of two closely related compounds disclosed in French BSM patent No. 8069, namely A=2-diethanolamino-4-morpholino-thiene[3,2-d]pyrimidine, and B=2-(4'-methyl-piperazino)-4-morpholino-thieno [3,2-d]pyrimidine, was also tested.

The following table shows the results obtained.

TABLE

| Compound | Minimum effective concentration for thrombocyte aggregation inhibiting action in test method according to— | |
|---|---|---|
|  | Born and Cross, mol/liter | Morris, mol/liter |
| Prior art: |  |  |
| A | $1 \times 10^{-4}$ | $1 \times 10^{-4}$ |
| B | $3 \times 10^{-5}$ | $1 \times 10^{-5}$ |
| Invention: |  |  |
| 4-(2'-methyl-morpholino)-2-piperazino-thieno[3,2-d]pyrimidine | $9 \times 10^{-6}$ | $7 \times 10^{-5}$ |
| 6-methyl-4-morpholino-2-piperazino-thieno[3,2-d]pyrimidine | $9 \times 10^{-6}$ | $6 \times 10^{-6}$ |
| 7-methyl-4-morpholino-2-piperazino-thieno[3,2-d]pyrimidine | $9 \times 10^{-6}$ | $7 \times 10^{-6}$ |
| 2-(2',5'-dimethyl-piperazino)-4-morpholino-thieno[3,2-d]pyrimidine | $9 \times 10^{-5}$ | $6 \times 10^{-6}$ |
| 2-piperazino-4-morpholino-thieno[3,2-d]-pyrimidine | $5 \times 10^{-6}$ | $3 \times 10^{-}$ |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.083 to 1.67 mgm./kg. body weight, preferably 0.166 to 0.84 mgm./kg. body weight; the daily dose rate is from 1.66 to 3.34 mgm./kg. body weight.

The following examples illustrate a few dosage unit compositions comprising a compound of the present invention as an active ingredient and represent the best modes contemplated of putting the invention into practical use. The parts are parts by weight unless otherwise specified.

Example 24

Tablets.—The tablet composition is compounded from the following ingredients:

| | Parts |
|---|---|
| 6-methyl-4-morpholino-2-piperazinothieno[3,2-d]pyrimidine dihydrochloride | 30.0 |
| Lactose | 38.0 |
| Potato starch | 26.0 |
| Polyvinylpyrrolidone | 5.0 |
| Magnesium stearate | 1.0 |
| Total | 100.0 |

Preparation: The thienopyrimidine compound is intimately admixed with the lactose and the potato starch, the resulting mixture is moistened with an ethanolic 20% solution of the polyvinylpyrrolidone, forced through a 1.5 mm.-mesh screen and dried at 45° C. The resulting granulate is again passed through a 1 mm.-mesh screen and then admixed with the magnesium stearate, and the finished composition is compressed into 100 mgm.-tablets. Each tablet contains 30 mgm. of the thienopyrimidine compound and is an oral dosage unit composition with effective thrombocyte aggregation inhibiting action.

Example 25

Coated pills.—The pill core composition is compounded from the following ingredients:

| | Parts |
|---|---|
| 6-methyl-4-morpholino-2-piperazinothieno[3,2-d]pyrimidine dihydrochloride | 15.0 |
| Lactose | 14.0 |
| Corn starch | 8.0 |
| Polyvinylpyrrolidone | 2.5 |
| Magnesium stearate | 0.5 |
| Total | 40.0 |

Preparation: The thienopyrimidine compound is intimately admixed with the lactose and the corn starch, the resulting mixture is moistened with an ethanolic 20% solution of the polyvinylpyrrolidone, forced through a 1.5 mm.-mesh screen and dried at 45° C. The resulting granulate is again passed through a 1 mm.-mesh screen and then admixed with the magnesium stearate, and the finished composition is compressed into 40 mgm.-pill cores which are subsequently coated with a thin shell consisting essentially of a mixture of talcum and sugar, and finally polished with beswax. Each pill contains 15 mgm. of the thienopyrimidine compound and is an oral dosage unit composition with effective thrombocyte aggregation inhibiting action.

Example 26

Hypodermic solution.—The solution is compounded from the following ingredients:

| | Parts |
|---|---|
| 4-(2'-methyl-morpholino)-1-piperazino-thieno[3,2-d]pyrimidine dihydrochloride | 10.0 |
| Polyethyleneglycol 600 | 100.0 |
| Distilled water q.s. ad 2000.0 parts by vol. | |

Preparation: The distilled water is briefly boiled and then cooled to room temperature in an atmosphere of nitrogen. The polyethyleneglycol and the thieneopyrimideine compound are dissolved in a sufficient amount of the pre-treated distilled water, and the solution is then diluted with the remainder of the distilled water to the indicated volume and then filtered until free from suspended matter. The filtrate is filled into brown 2 cc.-ampules in an atmosphere of nitrogen, and the ampules are sealed and sterilized for 20 minutes at 120° C. All of these steps must be performed in diffused light. Each ampule contains 10 mgm. of the thienopyrimidine compound, and the contents thereof are an intravenously injectable dosage unit composition with effective thrombocyte aggregation inhibiting action.

Example 27

Drop solution.—The solution is compounded from the following ingredients:

| | Parts |
|---|---|
| 4-(2'-methyl-morpholino)-2-piperazino-thieno[3,2-d]pyrimidine dihydrochloride | 10.0 |
| Cane sugar | 350.0 |
| Sorbic acid | 1.0 |
| Flavoring | 50.0 |
| Ethanol | [1] 200.0 |
| Polyethyleneglycol 600 | [1] 100.0 |

[1] By vol.

Preparation: The sorbic acid is dissolved in the ethanol, an equal amount of distilled water is added, and the thienopyrimidine compound is dissolved in the aqueous ethanolic solution while stirring (solution A). The cane sugar is dissolved in the remaining amount of distilled water (solution B). Solution B, the polyethyleneglycol and the flavoring are stirred into solution A, and the finished solution is filtered. 1 ml. of the filtrate (about 20 drops) contains 10 mgm. of the thienopyrimidine compound and is an oral dosage unit composition with effective thrombocyte aggregation inhibiting action.

All of the above preparation steps must be carried out in an atmosphere of nitrogen and under exclusion of strong light, and the filled ampules must be stored under the same conditions.

Analogous results are obtained when any one of the other thienopyrimidines embraced by Formula I or a non-toxic acid addition salt thereof is substituted for the particular thienopyrimidine in Examples 24 through 27. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, if will be readily apparent to others skilled in the art that the invention is not limited to these particular embodiments, and that various changes and modifications may be made without departing from the spirit of the invention or the scope of the appended claim.

We claim:

1. 4 - morpholino - 2-piperazino-thieno[3,2-d]pyrimidine or a non-toxic, pharmacologically acceptable acid addition salt thereof.

References Cited
FOREIGN PATENTS
1,057,612    2/1967   Great Britain.

ALEX MAZEL, Primary Examiner

J. TOVAR, Assistant Examiner

U.S. Cl. X.R.
424—248

PO-1050
(5/69)

UNITED STATES PATENT OFFICE
CERTIFICATE OF CORRECTION

Patent No. 3,763,156              Dated  October 2, 1973

Inventor(s) EBERHARD WOITUN, GERHARD OHNACKER, BERTHOLD NARR, ULRIKE HORCH and RUDOLF KADATZ It is certified that error appears in the above-identified patent and that said Letters Patent are hereby corrected as shown below:

Col. 1, line 9: correct "Feb." to read --Jan.--.

Col. 8, line 44: correct "$C_{14}H_{18}O_2S_2$" to read --$C_{14}H_{18}N_4O_2S_2$--.

Col. 12, 1st formula: correct 

to read 

Col. 15, line 10: correct "3-piperazino" to read -- 2-piperazino -

Col. 17, line 5: correct the spelling of "thrombocyte".

Col. 18, line 49: correct the spelling of "thieno--;

"   ", last line has been omitted:

"Distilled water q.s.ad 1000.0 parts by vol."

Signed and sealed this 10th day of September 1974.

(SEAL)
Attest:

McCOY M. GIBSON, JR.                C. MARSHALL DANN
Attesting Officer                    Commissioner of Patents